United States Patent Office 3,791,985
Patented Feb. 12, 1974

3,791,985
LUBRICATING COMPOSITIONS CONTAINING SULFUR CONTAINING PHOSPHATE ESTERS
Fred S. Eiseman, Jr., Maplewood, and Leslie M. Schenck, Mountainside, N.J., and John P. G. Beiswanger, Audubon, Pa., assignors to GAF Corporation, New York, N.Y.
No Drawing. Original application Oct. 13, 1970, Ser. No. 80,477, now Patent No. 3,723,578. Divided and this application June 9, 1972, Ser. No. 261,342
Int. Cl. C10m 1/48, 3/42, 1/06
U.S. Cl. 252—32.7 R          5 Claims

ABSTRACT OF THE DISCLOSURE

Sulfur containing phosphate esters of thio ethers of phenols and alkoxylated phenols are described, together with methods for their preparation and their use as lubricants. The sulfur containing phosphate esters described are represented by the general formula:

(I)
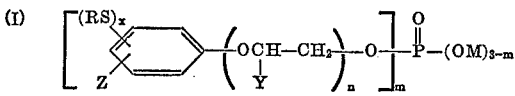

wherein:

R is an alkyl group of 1–20 carbon atoms, phenyl or aralkyl
$x$ is an integer of from 1 to 3 inclusive
$n$ is an integer of from 0 to 50 inclusive (preferably 1–20)
$m$ is an integer of 1 to 3 inclusive
Y is hydrogen, methyl or ethyl
Z is hydrogen or alkyl, of 1 to 20 carbons atoms and
M is a cation, e.g. H, alkali metal, alkaline earth metal, heavy metal, ammonium or amino.

These sulfur containing phosphate esters have valuable lubricating properties and exhibit good anti-wear extreme pressure properties both alone or in water or as additives to other lubricants, such as mineral oils, especially for use as cutting oils or other metal working applications, gear lubricants, etc.

---

This is a division of application Ser. No. 80,477, filed Oct. 13, 1970, now U.S. Pat. 3,723,578.

The present invention relates to novel sulfur containing phosphate esters which are useful as lubricants and are characterized by outstanding anti-wear and extreme pressure properties. More particularly, it is directed to mono-, di-, and tri-phosphate ethers of phenols and especially of alkoxylated phenols.

We have discovered that phosphate esters having the general formula:

(I)
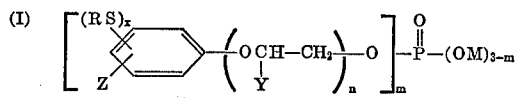

wherein:

R is an alkyl group of 1–20 carbon atoms, (including alkylphenyl) of 6 to 18 carbon atoms or aralkyl of 6 to 18 carbon atoms.
$x$ is an integer of 1, 2 or 3
$m$ is an integer of 1, 2 or 3
$n$ is an integer of from 0 to 50, preferably of from 1–20
Y is hydrogen, methyl or ethyl
Z is hydrogen or alkyl of from 1 to 20 carbon atoms, and
M is a cation, e.g. H, alkali metal, alkaline earth metal, heavy metal, ammonium or amino, are characterized by outstanding anti-wear and extreme pressure properties and are valuable lubricants and lubricant additives.

It is therefore an object of the present invention to provide sulfur containing phosphate esters which are new and outstanding in their anti-wear and extreme pressure properties.

Other and further objects will be apparent as the present description progresses.

The sulfur containing phosphate esters of the present invention may conveniently be prepared by the reaction with $P_2O_5$ of a thio ether of a phenol. Since the phosphate esters derived from an (alkylthio)-phenol, or more preferably an alkoxylated (alkylthio)-phenol are particularly preferred, the present invention will be described with particular reference to their production. This reaction can advantageously be carried out under the conditions disclosed in U.S. Pats. 3,004,056 to Nunn and Hesse and 3,004,057 to Nunn for the preparation of mixed mono- and di-esters of nonionic surfactants, and the disclosure of said patents is incorporated hereinby reference. As disclosed in said patents 1 mole of $P_2O_5$ is reacted with 2 to 4.5 moles of a nonionic surfactant, which for the production of the sulfur containing phosphate esters of the present invention is replaced by 2 to 4.5 moles of a thio ether of phenol, preferably an (alkylthio)-phenol or alkoxylated (alkylthio)-phenol. In its preferred form the reaction is conducted under substantially anhydrous conditions and at a temperature below about 110° C., since at higher temperatures there is a tendency for discolored and darkened products to be formed. The reaction is preferably carried out by adding the $P_2O_5$ gradually, with vigorous agitation to the (alkylthio)-phenol or alkoxylated (alkylthio)-phenol in liquid form.

The reaction is exothermic and cooling is necessary in some cases to keep the temperature below 110° C. The reaction proceeds continuously during the addition of the $P_2O_5$, and is preferably followed by maintenance of the reaction mixture at temperatures of from ambient up to 110° C., or even somewhat higher, for an additional period of time after completion of such addition to allow for complete solution of the $P_2O_5$ and its reaction with the (alkylthio)-phenol or alkoxylated (alkylthio)-phenol.

The reaction product obtained by carrying out the reaction as described above is a mixture of the primary esters (sometimes called monoesters) and secondary esters (sometimes called diesters) of phosphoric acid and the (alkylthio)-phenol or alkoxylated (alkylthio)-phenol, and may still contain appreciable amounts of unreacted (alkylthio)-phenol or alkoxylated (alkylthio)-phenol starting material. Such mixtures, which will usually consist of about 20 to 50% of a secondary phosphate ester, 30 to 80% of the primary phosphate ester and 0 to 50% of the unreacted (alkylthio)-phenol or alkoxylated (alkylthio)-phenol need not be separated, but are useful "as is" as lubricants and lubricant additives.

Since the ratio of primary and secondary phosphate esters is not critical and the presence of unreacted (alkylthio)-phenols or alkoxylated (alkylthio)-phenols, even up to 50% by weight of the total reaction product, is not detrimental to the attainment of the objects of the present invention, the mixture of products obtained directly as the reaction product in the process described above constitutes a preferred form of the sulfur containing phosphate esters of the present invention. The ratio of primary and secondary phosphate esters and the amount of unreacted starting material can, however, be controlled by various known techniques, if desired.

Thus, the amount of unreacted (alkylthio)-phenol or alkoxylated (alkylthio)-phenol can be reduced to a minimum of less than 10% by choice of the molar ratio of hydroxyl containing compound to $P_2O_5$.

If desired the triester may be produced, by reacting the (alkylthio)-phenol or alkoxylated (alkylthio)-phenol with $PCl_3$, or a triaryl phosphite, to form a phosphite which can then be readily oxidized to the triester, or the triester may be formed directly by reaction of the (alkylthio)-phenol or alkoxylated (alkylthio)-phenol with $POCl_3$.

The thio ethers of phenols which may be used as such or preferably in the form of their alkoxylated derivatives for the production of the sulfur containing phosphate esters of the present invention may be represented by the general formula:

(II)

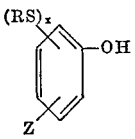

wherein R, $x$ and Z are as defined above.

A number of such thio ethers of phenols are known and methods for their preparation have been described in the chemical literature. For example, Farah and Gilbert in U.S. Pat. 3,134,818 disclose the production of (alkylthio)-phenols by the reaction of a dialkylsulfide with a phenol, which is unsubstituted in at least one of the positions ortho or para to the phenolic hydroxy group, in the presence of certain sulfonic acids as a catalyst. By selection of the particular phenol employed in their process the value of Z in the above formula can be varied. Thus, if phenol is used, Z will be H, if cresol is used Z will be methyl, products in which Z is butyl can be obtained by the use of butylphenol, those in which Z is nonyl can be obtained by the use of nonylphenol. Thus, by the selection of the appropriate alkylphenol the position of Z and the number of carbon atoms therein can be varied. Likewise by selection of the appropriate dialkyl sulfide to be used the specific nature or value of R can be varied. Products in which R, in the above formula is methyl can be obtained by the use of dimethylsulfide, while for R to be butyl or octyl, dibutylsulfide or dioctylsulfide, respectively, would be used. For R to be aryl a diaryl sulfide, e.g. diphenylsulfide, may be used, and if R is to be aralkyl, a di-aralkylsulfide, e.g. di-benzylsulfide, should be used. Other methods for the synthesis of thio ethers of phenols of the above formula are disclosed in U.S. Pat. 2,745,878 to Mavity, U.S. Pat. 2,923,743 to Delfs et al. and in an article by Miller and Read in JACS 55, 1224–1226 (1933) and may be used.

Since 4-(methylthio)-phenol and 4-(methylthio)-m-cresol are commercially available, and quite satisfactory products can be produced therefrom, we prefer to use them for the production of our novel phosphate esters. However, other thio ethers of phenols may be used if desired and as examples thereof may be mentioned:

o, m or p-(ethylthio)-phenol
o, m or p-(propylthio)-phenol
o, m or p-(butylthio)-phenol
4-(amylthio)-m-cresol
4-(methylthio)-o-cresol
2-(hexylthio)-4-ethylphenol
p-(octylthio)-phenol
p-(dodecylthio)-phenol
2,4-di(amylthio)-phenol
3,5-di(methylthio)-o-cresol
3,5-di(t.butylthio)-phenol
2,4-di(t.octylthio)-phenol
2-(methylthio)-4-(t.butylthio)-phenol
3-(methylthio)-5-t.octylphenol
3-(methylthio)-5-(t.octylthio)-phenol
2-(methylthio)-4-dodecylphenol
3,5-di(methylthio)-4-t.butylphenol
2,4-di(methylthio)-6-dodecylphenol
2-(phenylthio)-phenol
4-(phenylthio)-phenol
2-(phenylthio)-4-nonylphenol
2-(cresylthio)-phenol
p-(octadecylthio)-phenol
p-(eicosylthio)-phenol
4-(hexylthio)-o-cresol
4-(octylthio)-m-cresol
2-(octylthio)-p-cresol
2-(dodecylthio)-p-cresol
2-(octadecylthio)-p-cresol
2-(amylthio)-4-t.butylphenol
2,4,5-tri(methylthio)-phenol
2,4,6-tri(ethylthio)-phenol
2,4,5-tri(t.butylthio)-phenol
3,4,6-tri(methylthio)-o-cresol
4-(octylthio)-2-nonylphenol
4-(hexylthio)-2-dodecylphenol
2-(methylthio)-4-octadecylphenol
2,4-di(methylthio)-6-nonylphenol
2,4-di(butylthio)-6-nonylphenol
2-(cresylthio)-4-t.butylphenol
2-(benzylthio)-phenol
2-(benzylthio)-4-t.octylphenol The above-mentioned (alkylthio)-phenols may be used as such for the production of the novel phosphate esters of the present invention but preferably are converted to non-ionic polyglycol ethers, as by condensation thereof with one or more molar proportions of an alkylene oxide, and the thus obtained non-ionic polyglycol ethers then converted to the novel phosphate esters of the present invention.

The conversion of the (alkylthio)-phenols to non-ionic polyglycol ethers may readily be accomplished by the method disclosed in U.S. Pat. 2,213,477 for the production of non-ionic surfactants by the condensation of an alkylphenol with an alkyleneoxide, e.g. ethylene-oxide, propylene-oxide, butylene-oxide or a mixture of such oxides. In brief, the (alkylthio)-phenol is condensed with an alkylene-oxide, by introducing the alkylene-oxide into the heated (alkylthio)-phenol, which preferably contains a small amount of alkali, such as sodium or potassium hydroxide, as catalyst, until the desired amount of alkyleneoxide has been condensed with the (alkylthio)-phenol. As the amount of alkyleneoxide which is condensed with the (alkylthio)-phenol is increased, and thus the length of the polyglycol ether group increased (i.e. the number of alkenoxy groups in the polyglycol ether is increased, and "n" in Formula I above thus becomes higher) the water solubility of the thus obtained non-ionic polyglycol ethers (and also that of the phosphate esters produced therefrom) increases and their oil solubility decreases. While as much as 100 or more molar proportions of alkylene-oxide may readily be condensed with the (alkylthio)-phenol, there is little advantage in using molar proportions of this order of magnitude, and we therefore prefer to use from 1 to 20 molar proportions of alkylene-oxide per mole of (alkylthio)-phenol. Ethylene-oxide, propylene-oxide or butylene-oxide may be used for the production of the products of this invention, or if desired a mixture of such alkylene-oxides may be used, or if desired the (alkylthio)-phenol may first be condensed with one to several molar proportions of one alkylene-oxide, say propylene or butyleneoxide, and the thus obtained glycol ether then condensed with one or more molar proportions of another alkylene-oxide, say ethylene-oxide.

The oil solubility of the (alkylthio)-phenols (and also that of the polyglycol ethers and phosphate esters produced therefrom) increases as the number of carbon atoms in alkyl group of the (alkylthio)-phenol, and/or in any other alkyl substituent thereon, is increased. Also as the number of carbon atoms present in such alkyl groups increases the amount of alkylene-oxide necessary to obtain products having a given degree of water-solubility also increases. Thus by selection of the particular (alkylthio)-phenol, and/or the amount of alkylene-oxide condensed therewith, products having any desired degree of oil or water solubility can be "tailor-made."

Preferred methods for the production of the novel phosphate esters of the present invention, from the foregoing (alkylthio)-phenols or their/nonionic polyglycol ethers, are disclosed in U.S. Pats. 3,004,056 and 3,004,057, the disclosures of which are incorporated herein by reference; although, as indicated previously other methods of producing primary, secondary or tertiary phosphate esters of alcohols may be used if desired, and purity and/or ratio of the primary, secondary and/or tertiary esters controlled in the manner known in the art disclosed above.

The details of the preparation of the novel sulfur containing phosphate esters of the present invention will be apparent to those skilled in the art from the specific examples given below of the preparation and testing of certain preferred embodiments of this invention.

EXAMPLE 1

To a 500 ml. 4-necked flask there was charged 218 g. (0.54 mole) of the nonionic polyglycol ether obtained by condensing 6 moles of ethylene-oxide with 1 mole of 4-(methylthio)-phenol+6E.O." While the material in the flask was agitated at room temperature, nitrogen was bubbled in slowly and 28.5 g. (0.2 mole) of phosphorus pentoxide were added in small increments over a period of ½ hour. During the addition of the $P_2O_5$ the temperature was held below 40° C., by external cooling if necessary. On completion of the addition, the contents of the flask were heated to 90–95° C. and held at that temperature for 4 hours. The product was cooled and bottled. The thus obtained mixture of primary and secondary phosphate esters of 4-(methylthio)phenol+ 6E.O. which still contained some of the unreacted non-ionic polyglycol ether starting material had the following analysis:

| | Percent |
|---|---|
| Sulfur | 7.2 (theory—6.9). |
| Monoester | 43.6. |
| Diester | 45.6. |
| Non-ionic | 13.5 (unreacted). |

EXAMPLE 2

To a 500 ml. 4-necked flask was charged 226 g. (0.54 mole) of the non-ionic polyglycol ether obtained by condensing 6 moles of ethylene-oxide with 1 mole of 4-(methylthio)-m-cresol, hereinafter called "4-(methylthio)-m-cresol, +6E.O." The material in the flask was agitated at room temperature, nitrogen was bubbled in slowly and 28.5 g. (0.2 mole) of $P_2O_5$ were added in small shots over ½ hour while holding the temperature below 40° C. The batch was then heated to 90–95° C. and held at that temperature for 4 hours. The product, a mixture of primary and secondary phosphate esters of 4-(methylthio)-m-cresol containing some unreacted non-ionic starting material was then cooled and bottled. It has the following analysis:

| | Percent |
|---|---|
| Sulfur | 7.2 (theory—6.7). |
| Monoester | 37.5. |
| Diester | 59.6. |
| Nonionic | 8.87 (unreacted). |

EXAMPLE 3

To a 500 ml. 4-necked flask were charged 170 g. (0.70 mole) of 4-(methylthio)-phenol+2E.O. and the material agitated at room temperature. Nitrogen was bubbled in slowly and 28.5 g. of $P_2O_5$ were added in small portions over ½ hour, holding the temperature below 40° C. The batch was then heated to 90–95° C. and held at that temperature for 4 hours. The product was cooled and bottled. It has the following analysis:

| | Percent |
|---|---|
| Sulfur | 10.2 (theory—10.4). |
| Monoester | 41.7. |
| Diester | 12.5. |

EXAMPLE 4

The anti-wear properties of aqueous solutions, of 0.25% concentration, of the products of the foregoing Examples 1, 2 and 3 were ascertained in a Brown modified "Shell" Four Ball machine using 4 steel balls, SAE 52–100, as described in U.S. Pat. 3,036,072. The tests were run at room temperature, 1500 r.p.m. and 100 kg. load. For purposes of comparison, control tests were run with two sulfur free phosphate ester lubricants, produced in an analogous manner from non-ionic surfactants containing a polyglycol ether group and which are sold commercially as lubricants. "Phosphate ester A" and "Phosphate ester B," used for comparison, were mixtures of primary and secondary phosphate esters produced as described in U.S. Pat. 3,004,056 from Phenol+6E.O.

The results of this evaluation are given in Table 1.

TABLE 1

| Test solution | | Results, shell four ball scar diameters, mm. | |
|---|---|---|---|
| Product tested | Concentration, percent | 10 min. | 30 min. |
| Product of Example 1 | 0.25 | 0.667 | 0.784 |
| Product of Example 2 | 0.25 | 0.650 | 0.709 |
| Product of Example 3 | 0.25 | 0.648 | 0.726 |
| Phosphate ester A | 0.25 | 0.925 | 0.984 |
| Phosphate ester B | 0.25 | 0.650 | 0.834 |

EXAMPLE 5

When the procedure of Example 1 is repeated except that 374 g. (0.50 mole) of the non-ionic polyglycol ether obtained by condensing 10 moles of ethylene oxide with 1 mole of 3-nonyl-4(butylthio)-phenol, hereinafter called "3-nonyl-4(butylthio)-phenol+10 E.O." is used (instead of 218 g. of 4-(methylthio)-phenol+6 E.O.), there is obtained a mixture of primary and secondary phosphate esters of 3-nonyl-4(butylthio)-phenol+10 E.O. having the following typical analysis:

| | Percent |
|---|---|
| Sulfur | 4.1 (theory—3.98). |
| Monoester | 41.8. |
| Diester | 46.5. |
| Nonionic | 11.4 (unreacted). |

EXAMPLE 6

When the procedure of Example 1 is repeated except that 306 g. (0.50 mole) of the non-ionic polyglycol ether obtained by condensing 5 moles of ethylene oxide with 1 mole of 2-(octadecylthio)-4-methyl phenol, hereinafter called "2-(octadecylthio)-4-methyl phenol+5 E.O.," there is obtained a mixture of primary and secondary phosphat esters of 2-(octadecylthio)-4-methyl phenol+5 E.O. having the following typical analysis:

| | Percent |
|---|---|
| Sulfur | 4.6 (theory—4.8). |
| Monoester | 46.2. |
| Diester | 43.8. |
| Nonionic | 9.8 (unreacted). |

EXAMPLE 7

Into a 1-liter-3-neck flask equipped with, thermometer, agitator and distillation head with thermometer and condenser charge 62 g. (0.2 mole) of triphenyl phosphite and 250.8 g. (0.6 mole) of the non-ionic polyglycol ether obtained by condensing 6 moles of ethylene oxide with 1 mole of 4-(methylthio)-m-cresol. Heat the reaction mixture at 10 mm. pressure to 160–170° C., collecting phenol as the distillate from the transesterification. When about 90% of the expected quantity of phenol (approximately 50 g.) has been collected, increase the temperature to 220–240° C. to complete the reaction and distill out the remaining phenol. The tri-[4-(methylthio)-m-cresyl]-phosphite is recovered in substantially quantitative yield. After cooling to room temperature the phosphite is essentially quantitatively oxidized to the phosphate by adding thereto 1.25 g. (0.005 mole) of dibenzoylperoxide and heating, with stirring, under slight oxygen pressure (50–60 mm. Hg) until the theoretical weight gain of 3.2 g. is attained (in approximately 11 hours). No detectable hydrolysis occurs during the oxidation.

The novel sulfur containing primary and secondary phosphate esters of the present invention can be used as lubricants either in their free acid form or in the form of their salts, such as their alkali metal salts, e.g. sodium, potassium or lithium salts, their alkaline earth metal salts, e.g. barium, calcium, magnesium and strontium salts, heavy metal salts, e.g. iron, zinc, lead, cadmium and copper salts, and ammonium salts and substituted ammonium (amine) salts, e.g., methylamine, propylamine, mono-, di- and triethanol-amine salts etc.

The novel sulfur containing phosphate esters of the present application can be used as such or as an aqueous emulsion or solution in such metal working applications as cutting oils, rolling oils, slushing oils and the like. They are also valuable as additives to mineral lubricating oils of petroleum origin and synthetic lubricants, for these and other applications such as greases, rust-preventives, gear, turbine, transmission and similar oils and lubricants to improve the anti-wear extreme pressure properties thereof.

As examples of synthetic lubricants in which the products of the present invention are useful additives may be mentioned: ester lubricants such as alkyl oxalates, malonates, succinates, glutarates, adipates, pimelates, suberates azelates, sebacates, esters from polyols such as pentaerythritol, trimethylol propane and sorbitol, alkyl esters of aliphatic monocarboxylic acids such as lauric, oleic, palmitic, stearic and behenic acids and the like. Other lubricants include silicone lubricants such as polysiloxane oils and greases of the type poly-alkyl, polyaryl, polyalkoxy, polyaryloxy such as polydimethoxy-phenoxy siloxane, silicate ester oils such as tetraalkyloxy and tetraaryloxy-silanes, and the like. Also fluorocarbon lubricants such as

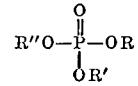

where $n=$ an integer, and polyalkylene glycol lubricants such as ethylene oxide-propylene oxide copolymers and phosphate esters such as

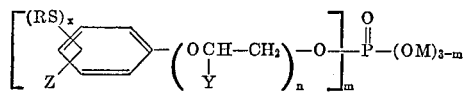

wherein R, R' and R'' represent hydrogen, phenyl, alkylphenyl or an alkyl radical such as butyl, octyl, lauryl, oleyl, palmityl and the like.

We claim:
1. Lubricating composition consisting of a vehicle selected from the group consisting of water and lubricating oils and a friction reducing amount of a sulfur containing phosphate ester of the formula:

$$\left[\begin{array}{c}(RS)_x\\ \phantom{x}\\ Z\end{array}\bigcirc\left(OCH-CH_2\atop Y\right)_n-O\right]_m \!\!\!-\!\!\!\overset{O}{\underset{\phantom{O}}{\overset{\|}{P}}}-(OM)_{3-m}$$

wherein R is an alkyl group of 1–20 carbon atoms, phenyl or benzyl; $x$ is an integer of from 1 to 3 inclusive; $n$ is an integer of from 0 to 50 inclusive; $m$ is an integer of 1 to 3 inclusive; Y is hydrogen, methyl or ethyl; Z is hydrogen or alkyl, of 1 to 20 carbon atoms and M is a cation selected from the group consisting of H, alkali metal and alkaline earth metal.

2. Lubricating composition according to claim 1 wherein X is 1 and $n$ is an integer of 0 to 20 inclusive.

3. Lubricating composition according to claim 2 wherein Z is alkyl of 1 to 20 carbon atoms.

4. Lubricating composition according to claim 3 wherein R is methyl.

5. Lubricating composition according to claim 2 wherein R is methyl and Z is methyl.

References Cited
UNITED STATES PATENTS

| | | | |
|---|---|---|---|
| 3,245,979 | 4/1966 | Nelson et al. | 252—32.7 E X |
| 3,547,820 | 12/1970 | Woodward et al. | 252—32.5 |

PATRICK P. GARVIN, Primary Examiner

A. H. METZ, Assistant Examiner

U.S. Cl. X.R.

252—46.6, 49.5